(12) United States Patent
Xie et al.

(10) Patent No.: US 9,081,462 B2
(45) Date of Patent: Jul. 14, 2015

(54) TOUCH PANEL AND MANUFACTURING METHOD THEREOF

(75) Inventors: Yanjun Xie, Wuhan (CN); Kwan-Sin Ho, Miaoli (TW)

(73) Assignee: TPK TOUCH SOLUTIONS (XIAMEN) INC., Xiamen (CN)

( * ) Notice: Subject to any disclaimer, the term of this patent is extended or adjusted under 35 U.S.C. 154(b) by 368 days.

(21) Appl. No.: 13/409,081

(22) Filed: Feb. 29, 2012

(65) Prior Publication Data

US 2013/0043068 A1    Feb. 21, 2013

(30) Foreign Application Priority Data

Aug. 17, 2011   (CN) .......................... 2011 1 0270292

(51) Int. Cl.
    *G06F 3/047*    (2006.01)
    *G06F 3/044*    (2006.01)
(52) U.S. Cl.
    CPC ................ *G06F 3/047* (2013.01); *G06F 3/044* (2013.01); *G06F 2203/04103* (2013.01); *G06F 2203/04111* (2013.01)
(58) Field of Classification Search
    CPC ....................................................... G06F 3/047
    See application file for complete search history.

(56) References Cited

U.S. PATENT DOCUMENTS

2012/0073124 A1* 3/2012 Chien et al. ..................... 29/622
2012/0081300 A1* 4/2012 Chan et al. ..................... 345/173

FOREIGN PATENT DOCUMENTS

TW          M348281          1/2009
TW          M388686          9/2010

* cited by examiner

*Primary Examiner* — Jeremy C Norris
(74) *Attorney, Agent, or Firm* — Gokalp Bayramoglu

(57) ABSTRACT

The present disclosure provides a manufacturing method for a touch panel comprising: disposing an electrode layer extending from touch area of a substrate to periphery area of the substrate, wherein the periphery area surrounds the periphery of the touch area. The method further includes disposing an insulation layer in the periphery area of the substrate to form a shielding layer, making the shielding layer cover the overlapping electrode in the periphery area and making the electrode layer of the touch area and the overlapping electrode locate on the same layer of the substrate so as to avoid fluctuation of resistance value in the electrode layer due to height difference. Meanwhile, adopting the disposition method also maintains insulating performance of the shielding layer. The present disclosure also provides a touch panel made by the manufacturing method.

13 Claims, 5 Drawing Sheets

US 9,081,462 B2

TOUCH PANEL AND MANUFACTURING METHOD THEREOF

BACKGROUND OF THE INVENTION

This Application claims the benefit of the People's Republic of China Application No. 201110270292.7; filed on Aug. 17, 2011.

FIELD OF THE INVENTION

The present disclosure relates to a touch panel and a manufacturing method thereof, and more particularly to a capacitive touch panel and manufacturing method thereof.

DESCRIPTION OF THE RELATED ART

Touch panel is a platy structure object, usually configured in electronic touch devices such as LCD screens.

Referring to FIG. 1 and FIG. 2, FIG. 1 is a block flowchart of a manufacturing method for a conventional touch panel and FIG. 2 is a schematic sectional view of a conventional touch panel.

Step S1: disposing an opaque shielding layer 500 in periphery area 120 of a substrate 100;

Step S2: disposing an electrode layer 200 on the substrate 100. The electrode layer 200 comprises a sensing electrode 202 directly formed in the touch area 110 of the substrate 100 and an overlapping electrode 201 formed on the shielding layer 500;

Step S3: disposing a circuit layer 400 on the shielding layer 500. The circuit layer 400 is electrically connected to the overlapping electrode 201 of the electrode layer 200 so as to transmit touch signals sensed by the sensing electrode 202 to the external circuit (not shown).

According to the above steps, a touch panel is formed by disposing shielding layer 500, electrode layer 200, and circuit layer 400 on the substrate 100 in sequence. However, in the above manufacturing process, the shielding layer 500 is formed prior to the electrode layer 200, while the electrode layer 200 needs to be baked at high temperature after step S2, which forces the shielding layer 500, formed in step S1, to accept high temperature baking, which as a result decreases insulating performance of the shielding layer 500. This, in turn, makes wires of the circuit layer 400 electrically connect to each other leading to incapability of normal operation of the touch panel. Besides, as the shielding layer 500 itself has a certain thickness and the electrode layer 200 is formed after the shielding layer 500, there is a height difference between the overlapping electrode 201 and the sensing electrode 202, which makes resistance of the electrode layer 200 fluctuate and affects the accuracy of touch detection.

SUMMARY OF THE INVENTION

The present invention provides a touch panel and a manufacturing method thereof to solve the issue of decrease of insulating performance of the shielding layer and fluctuation of resistance of the electrodes in the electrode layer by changing the order of electrode disposition.

Manufacturing method for the propose touch panel comprises:
First, disposing an electrode layer, extending from touch area of a substrate to form an overlapping electrode in periphery area of the substrate such that electrical signals of the touch area are transmitted to an external control circuit through an overlapping electrode, wherein the periphery area surrounds periphery of the touch area; and then, disposing an insulation layer in the periphery area of the substrate to form a shielding layer, wherein the shielding layer covers the overlapping electrode in the periphery area.

The electrode layer is not shielded by the insulation layer when it is disposed on the substrate, and therefore the overlapping electrode and the electrode layer of the touch area are located on the same horizon of the substrate without height difference, which avoids fluctuation of the electrode's resistance value to keep the accuracy of touch detection. Moreover, the above manufacturing method disposes an electrode layer on a substrate and then disposes an insulation layer to form a shielding layer in the periphery area, which makes the electrode layer formed prior to the shielding layer. This maintains insulating performance of the shielding layer and does not impact the electrode layer during the conventional high-temperature baking.

In a specific embodiment:
The step of forming the overlapping electrode in the periphery area further comprises disposing the electrode layer in the touch area to form a sensing electrode. The sensing electrode comprises: a plurality of serially-connected electrodes disposed along a first polar axis direction; a connection line formed between the serially-connected electrodes and electrically connected to the serially-connected electrodes; and a plurality of independent electrodes, mutually insulated and disposed at both sides of the connection line with intervals along a second polar axis direction.

The step of forming the overlapping electrode in the periphery area further comprises: extending the independent electrodes and the serially-connected electrodes to the periphery area so as to form a first overlapping electrode and a second overlapping electrode. It further comprises: making the shielding layer cover the overlapping electrode and forming a wiring hole through the shielding layer on the overlapping electrode, more particularly, making the shielding layer cover the first overlapping electrode and the second overlapping electrode; and forming a wiring hole through the shielding layer respectively on the first overlapping electrode and the second overlapping electrode.

The step of forming the shielding layer in the periphery area comprises disposing the insulation layer in the touch area covering the connection line on the sensing electrode at the same time to form an insulation bridge.

The insulation bridge and the shielding layer are formed at the same time when disposing the insulation layer, not having to dispose the insulation bridge and the shielding layer separately, which simplifies the manufacturing process. The insulation bridge and the shielding layer are disposed after the electrode layer is disposed and therefore the insulation bridge also would not be affected by the conventional high-temperature baking after the electrode layer is formed, which is good for maintaining insulating performance of the insulation bridge.

Further, the method further comprises disposing a circuit layer on the shielding layer to form a main conducting wire, the main conducting wire being electrically connected to the overlapping electrode. The step further comprises disposing the circuit layer on the insulation bridge at the same time to form a bridge wire, wherein the bridge wire is electrically connected to the independent electrodes at both sides of the connection line while the main conducting wire is electrically connected to the overlapping electrode via the wiring hole on the overlapping electrode. More particularly, the main conducting wire comprises a first conducting wire and a second conducting wire, the first conducting wire being electrically connected to the independent electrodes via the wiring hole on the first overlapping electrode and the second conducting wire being electrically connected to the serially-connected electrodes via the wiring hole on the second overlapping electrode.

Insulating performance of the shielding layer and the insulation bridge can be maintained effectively so that the insulation avoids mutual conduction of the circuits in the circuit layer.

In another embodiment, the substrate further comprises an icon area preset in the periphery area, and the manufacturing method further comprises disposing the electrode layer to form an independent end electrode, an independent sub-electrode, and a serially-connected sub-electrode and a sub connection line extending from the serially-connected electrode to the icon area at the same tune when forming the overlapping electrode and the sensing electrode, wherein the serially-connected sub-electrode and the serially-connected electrode are serially and electrically connected by the sub connection line, and mutually insulated independent end electrode and independent sub-electrode are formed at both sides of the sub connection line with intervals.

The step of forming the shielding layer covers the scope of the shielding layer which in turn contains the icon area that covers the independent end electrode, independent sub-electrode, serially-connected sub-electrode and sub connection line, wherein the independent end electrode and the independent sub-electrode expose a sub wiring hole through the shielding layer respectively and the independent end electrode also expose an end wiring hole through the shielding layer.

The method further comprises disposing a circuit layer on the shielding layer at the same time to form a bridge sub-wire and an overlapping sub-wire, wherein the bridge sub-wire is formed in the icon area and electrically bridged to the independent end electrode and the independent sub-electrode via the sub wiring holes while the overlapping sub-wire is electrically connected to the independent end electrode via the end wiring hole.

Based on the above-mentioned steps, it is possible to dispose the touch structure forming the icon area simultaneously in the process of manufacturing electrode layer, insulation layer, and circuit layer so that the effects of maintaining insulating performance of the insulation layer help avoid fluctuation of resistance value of the electrode layer and avoid mutual conduction of the circuits in the circuit layer, both of which are achieved simultaneously in the icon area.

According to the above manufacturing method, a touch panel can be made, the touch panel comprising:

an overlapping electrode, formed by disposing an electrode layer, extending from touch area of a substrate to periphery area of the substrate, electrical signals of the touch area being transmitted to an external control circuit through an overlapping electrode, wherein the periphery area surrounds periphery of the touch area; and a shielding layer, formed by disposing an insulation layer set in the periphery area of the substrate and covering the overlapping electrode in the periphery area.

It further comprises a circuit layer, the circuit layer forming several main conducting wires disposed on the shielding layer, the main conducting wire being electrically connected to the overlapping electrode, more particularly, the main conducting wire being electrically connected to the overlapping electrode via a wiring hole through the shielding layer formed on the overlapping electrode.

It further comprises a sensing electrode, set in the touch area and formed by disposing the electrode layer. The sensing electrode comprises: a plurality of serially-connected electrodes disposed along a first polar axis direction; a connection line set between serially-connected electrodes and electrically connected to the serially-connected electrodes; and a plurality of independent electrodes, mutually insulated and disposed at both sides of the connection line with intervals along a second polar axis direction.

The overlapping electrode comprises: a first overlapping electrode, formed by extending from the independent electrode to the periphery area; and a second overlapping electrode, formed by extending from the serially-connected electrode to the periphery area. The first and second overlapping electrodes are covered by the shielding layer, and a wiring hole through the shielding layer is formed respectively on the first and second overlapping electrodes.

It further comprises an insulation bridge, formed by disposing the insulation layer and setting the same on the connection line of the sensing electrode.

Besides, it further comprises: a main conducting wire set on the shielding layer of the periphery area and formed by a circuit layer; and a bridge wire set on the insulation bridge of the touch area and formed by the circuit layer. The bridge wire is electrically connected to the independent electrodes at both sides of the connection line and the main conducting wire comprises a first conducting wire and a second conducting wire, the first conducting wire being electrically connected to the independent electrodes via the wiring hole on the first overlapping electrode and the second conducting wire being electrically connected to the serially-connected electrodes via the wiring hole on the second overlapping electrode.

In another specific embodiment, the substrate further comprises an icon area preset in the periphery area, the icon area comprising an independent end electrode and an independent sub-electrode formed by the electrode layer and a serially-connected sub-electrode and a sub connection line extending from the serially-connected electrode to the icon area, wherein the serially-connected sub-electrode and the serially-connected electrode are serially and electrically connected by the sub connection line, and mutually insulated independent end electrode and independent sub-electrode are formed at both sides of the sub connection line with intervals.

Covering scope of the shielding layer contains the icon area to cover the independent end electrode, independent sub-electrode, serially-connected sub-electrode and sub connection line, wherein the independent end electrode and the independent sub-electrode expose a sub wiring hole through the shielding layer respectively and the independent end electrode also exposes an end wiring hole through the shielding layer.

It further comprises: a bridge sub-wire, formed by a circuit layer and set on the shielding layer of the icon area, electrically bridged to the independent end electrode and the independent sub-electrode via the sub wiring holes; and an overlapping sub-wire, formed by the circuit layer and set on the shielding layer of the periphery area, electrically connected to the independent end electrode via the end wiring hole.

Based on the above-mentioned disclosure for the touch panel, touch structures in the touch area, periphery area, and icon area have effects of maintaining insulating performance of the shielding layer and insulation bridge in the insulation layer, avoiding fluctuation of resistance value in the electrode layer and avoiding mutual conduction of the circuits in the circuit layer.

DETAILED DESCRIPTION OF THE EMBODIMENTS

The First Embodiment

Figure 1:
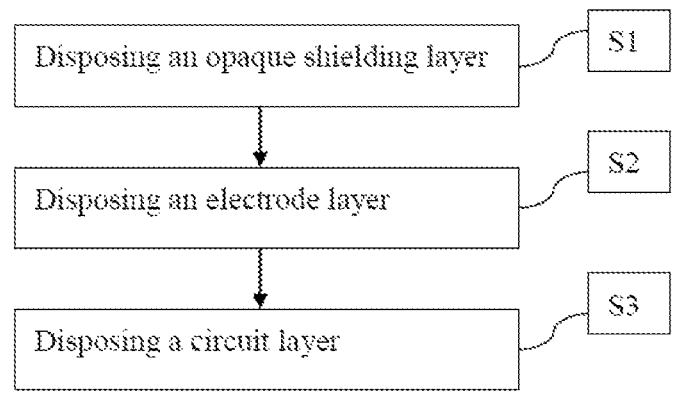
FIG. 1 is a block flowchart of a manufacturing method for a conventional touch panel.
Figure 2:
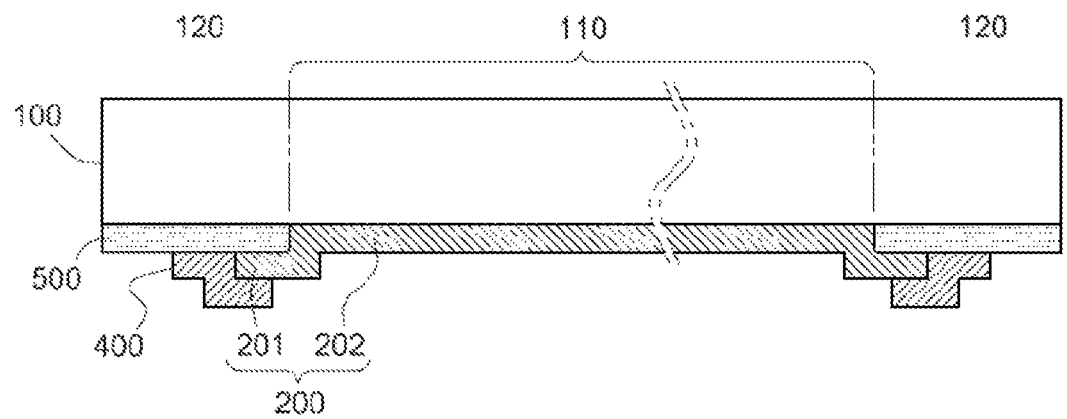
FIG. 2 is a schematic sectional view of a conventional touch panel.
Figure 3:
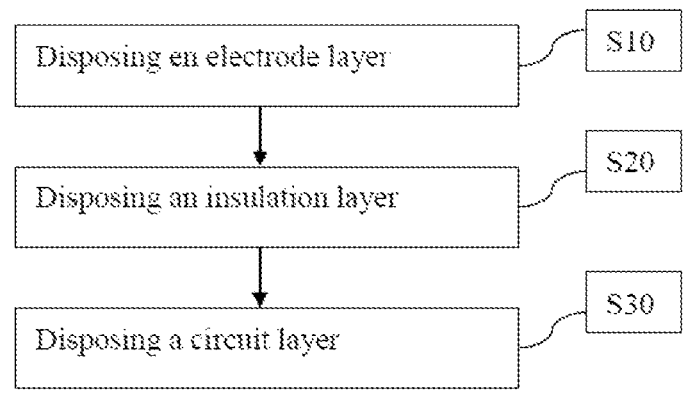
FIG. 3 is a block flowchart of a manufacturing method in accordance with the present invention.
Figure 4:
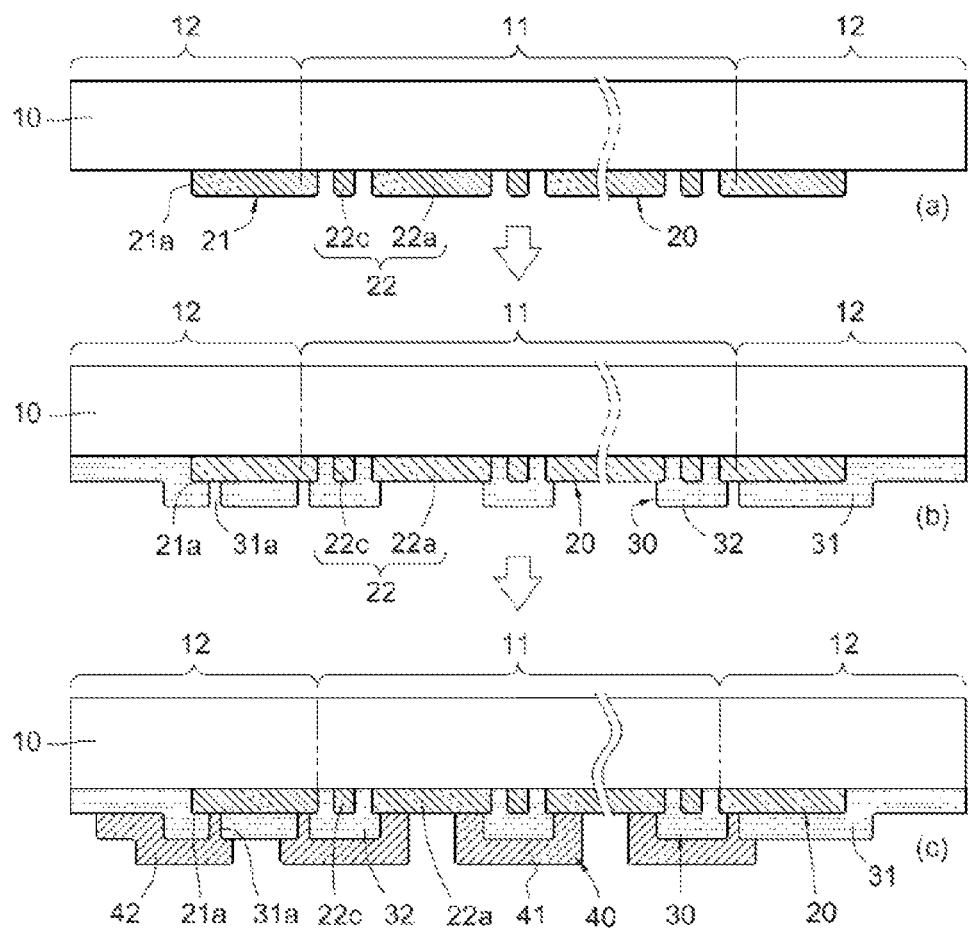
FIG. 4(a) to FIG. 4(c) are schematic sectional views of the structure of the present invention in disposition process disclosed one by one according to the method of FIG. 3.
Figure 5:
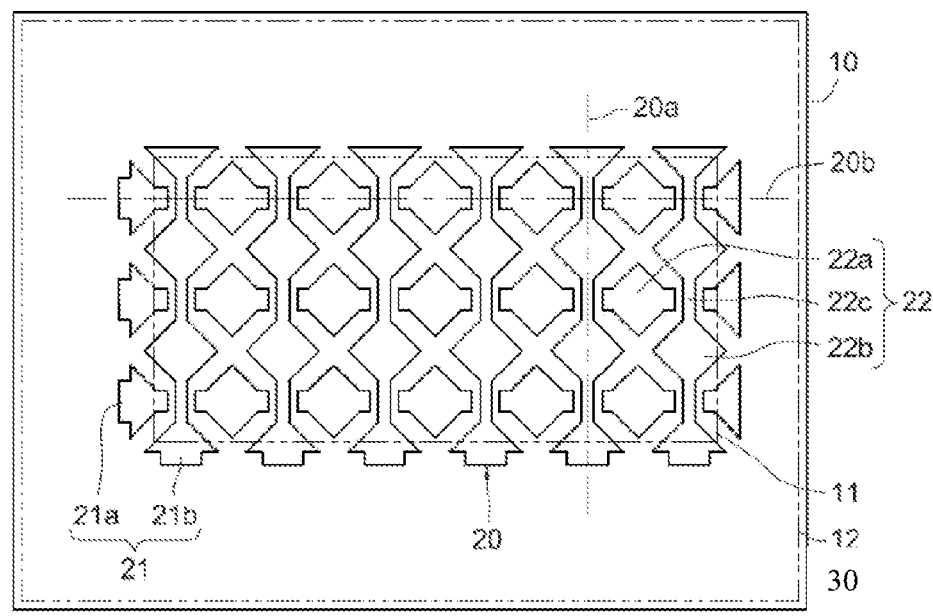
FIG. 5 to FIG. 7 are plan bottom views of the structure according to each view of FIG. 4(a) to FIG. 4(c)
Figure 6:
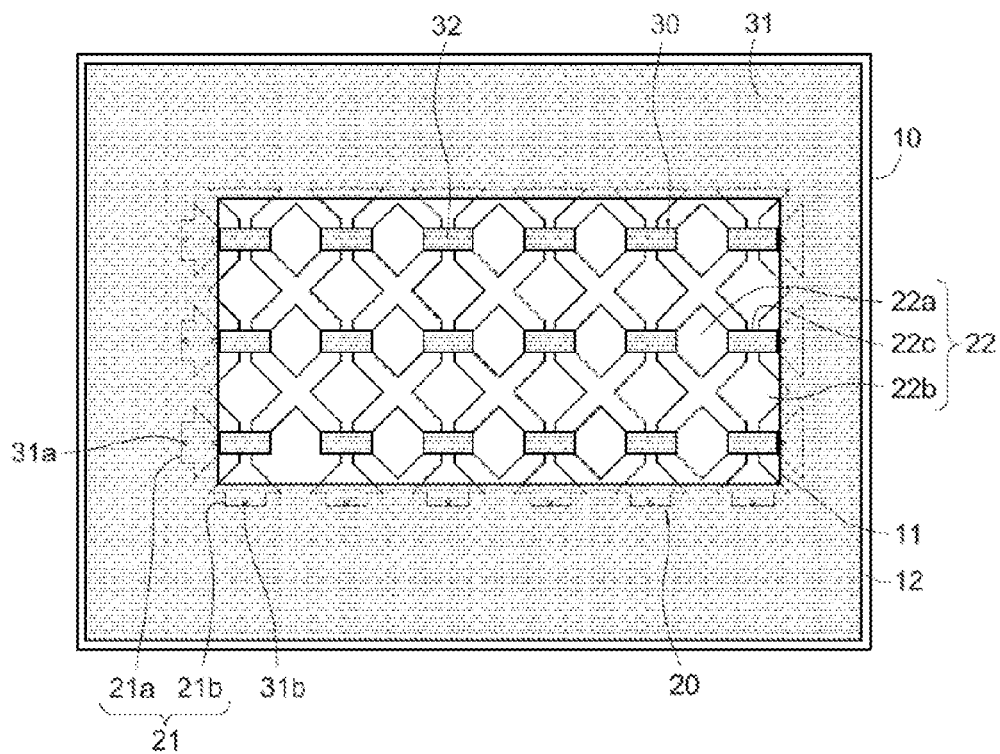
Figure 7:
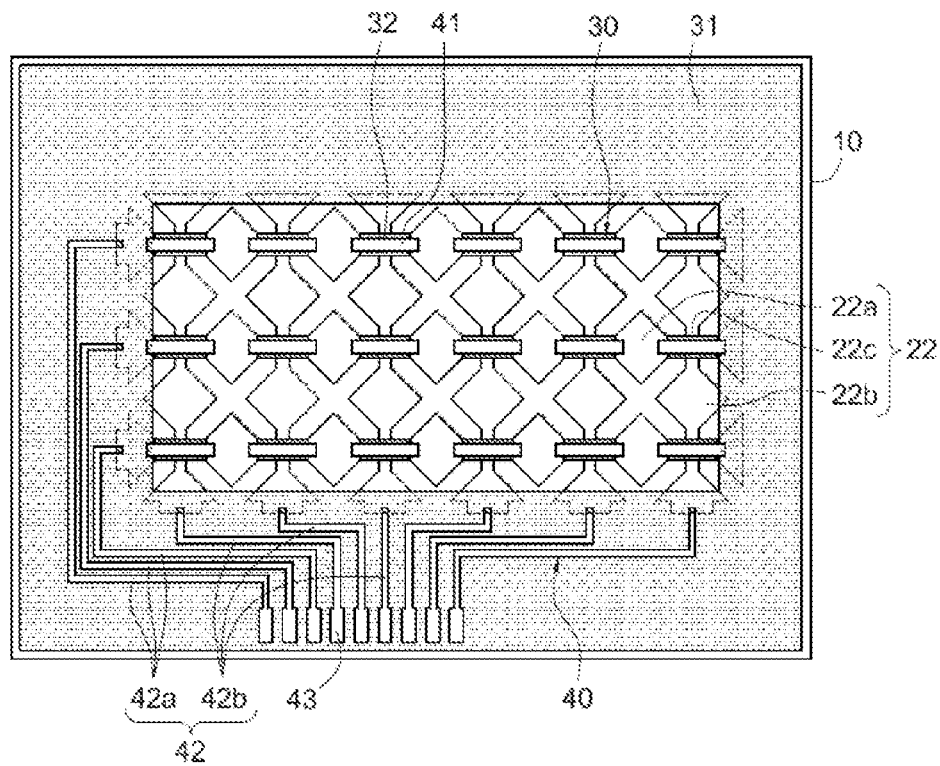

In view of carrying out the manufacturing method for touch panel in accordance with the present disclosure, particularly relating to the manufacturing method for a capacitive touch panel, refer to FIG. 3 to FIG. 7. FIG. 3 discloses a block flowchart of the manufacturing method in accordance with the present invention; FIG. 4(a) to FIG. 4(c) are schematic sectional views of the touch panel of the present disclosure in disposition process disclosed one by one according to the method of FIG. 3; FIG. 5 to FIG. 7 are plan bottom views of the structure according to each view of FIG. 4(a) to FIG. 4(c). Manufacturing method for the touch panel comprises: step S10, first disposing an electrode layer 40, extending an overlapping electrode 21 from touch area 11 of a substrate 10 to periphery area 12 of the substrate 10 so that electrical signals of the touch area 11 will be transmitted to an external control circuit through the overlapping electrode 21, wherein the periphery area 12 surrounds the periphery of the touch area 11; and then in step S20, disposing an insulation layer 30 in the periphery area 12 of the substrate 10 to form a shielding layer 31, wherein the shielding layer 31 covers the overlapping electrode 21 in the periphery area 12. Furthermore, in the present embodiment, the method also comprises step S30, forming a circuit layer 40 on the insulation layer 30. Detailed manufacturing steps are described as follows:

Substrate 10 can be made of glass, transparent lens or any transparent passivation material that is good for finger touch with good light transmittance. A touch area 11 is defined on the substrate 10. The touch area 11 can possess transparent region of rectangular, arc, circle, grid or other two-dimensional shapes and the area of the touch area 11 is smaller than the substrate 10 so that a periphery area 12 can be defined to surround the touch area 11 on the substrate 10.

The electrode layer 20, disposed in step S10, is located on the substrate 10 within the region scope of the touch area 11, and the electrode layer 20 extends at the same time to form several overlapping electrodes 21 to the periphery area 12 of the substrate 10.

While forming the overlapping electrodes 21 in the periphery area 12, the method further comprises disposing the electrode layer 20 in the touch area 11 to form sensing electrodes 22 so that the overlapping electrodes 21 and the sensing electrodes 22 are completed simultaneously in the same electrode layer 20 disposition process.

ITO can be elected as material for forming the electrode layer 20 by low-temperature sputtering. The substrate 10 is taken as target to form an ITO layer by the disposition means of low-temperature sputtering (30~40° C.) and form overlapping electrodes 21 and sensing electrodes 22 reticularly disposed on the substrate 10 by means of solvent etching or laser etching. Then, the electrode layer 20 can be baked in high temperature of about 240° C. so that the overlapping electrodes 21 and the sensing electrodes 22 are more stable after they are formed.

The sensing electrodes 22 comprise a plurality of independent electrodes 22a, a plurality of serially-connected electrodes 22b, and a plurality of connection lines 22c. The independent electrodes 22a are disposed along a second polar axis direction 20b and the serially-connected electrodes 22b are disposed along a first polar axis direction 20a; the connection lines 22c are formed between the serially-connected electrodes 22b and electrically connected to the serially-connected electrodes 22b; the independent electrodes 22a are mutually insulated and disposed at both sides of the connection lines 22c with intervals.

The step of forming the overlapping electrodes 21 in the periphery area 12 comprises extending the independent electrodes 22a and the serially-connected electrodes 22b to the periphery area 12 so as to form a first overlapping electrode 21a and a second overlapping electrode 21b, wherein the extension directions of the first overlapping electrode 21a and the second overlapping electrode 21b are the same as the disposition directions of the independent electrode 22a and the serially-connected electrode 22b respectively. In an embodiment, the extension directions are along the second polar axis direction 20b and the first polar axis direction 20a respectively, or along other extension directions between the first polar axis direction 20a and the second polar axis direction 20b according to the planning of design. However, in an embodiment, extension directions of the independent electrode 22a and the serially-connected electrode 22b are different.

Besides, when manufacturing the touch panel, the first polar axis direction 20a and the second polar axis direction 20b can be defined as X-axis and Y-axis of the rectangular coordinate system, or as T-axis and N-axis of the tangential/normal coordinates, or as polar coordinates, etc.

The insulation layer 30 disposed in step S20 can be made of opaque PMMA or other plastic materials with insulating property and disposed in the periphery area of the substrate 10 by screen printing to form a shielding layer 31, making the shielding layer 31 cover the overlapping electrodes 21 in the periphery area 12.

More specifically, the shielding layer 31 covers the first overlapping electrode 21a and the second overlapping electrode 21b, and wiring holes 31a and 31b through the shielding layer 31 are formed respectively on the first overlapping electrode 21a and the second overlapping electrode 21b.

The step of forming the shielding layer 31 in the periphery area 12 also comprises disposing the insulation layer 30 in the touch area 11 covering the connection lines 22c on the sensing electrodes 22 at the same time to form an insulation bridge 32.

In an embodiment, the insulation bridge 32 and the shielding layer 31 are completed simultaneously in the same disposition process. Comparing with disposing the insulation bridge 32 and the shielding layer 31 separately, the present disclosure reduces one manufacturing process so that the manufacturing process is simplified. The disposition process makes the insulating plastic material cover the Whole substrate 10, and then makes the insulation layer 30 in the touch area 11 only cover the connection line 22c by means of exposure, developing, etching and drying so as to form the insulation bridge 32. The remaining part of the touch area 11 is exposed after developing, wherein quantity of the insulation bridges 32 is equal to that of the connection lines 22c. At the same time, insulation layer 30 covers the periphery area 12 to form the shielding layer 31 and the shielding layer 31 covers the first overlapping electrode 21a and the second overlapping electrode 21b in the periphery area 12. In an embodiment, the wiring holes 31a and 31b are formed through the shielding layer 31 by the means of exposure, developing and drying.

Based on the step S10 and the step S20, the present disclosure can also enable the electrode layer 20 to be formed prior to the shielding layer 31, as to avoid high-temperature baking of the shielding layer 31 along with the electrode layer 20 and achieve stable efficacy of maintaining insulating performance of the shielding layer 31. Besides, the overlapping electrodes 21 and the sensing electrodes 22 are directly and simultaneously formed on the surface of the substrate 10 on the same horizon or the same plane without blocking of the shielding layer 31, and therefore there is no height difference, which avoids fluctuation of resistance values of the overlapping electrodes 21 and the sensing electrodes 22 and contributes to keep accuracy of the touch detection.

The circuit layer 40 disposed in step S30 can be made of conductive metal materials such as silver paste and disposed on the insulation layer 30 by means of screen printing; photoresist coating, exposure, developing, etching and residual photoresist cleaning. Several main conducting wires 42 can be formed on the shielding layer 31 and can be electrically connected to the overlapping electrodes 21, and a bridge wire 41 is formed correspondingly on the insulation bridge 32; thereby making a touch panel with a multi-layer structure.

Bridge wire 41 is electrically connected to the independent electrodes 22a at both sides of the connection line 22c while the main conducting wire 42 is electrically connected to the overlapping electrode 21 through the wiring hole on the overlapping electrode 21. Further, the main conducting wire 42 comprises a first conducting wire 42a and a second conducting wire 42b, the first conducting wire 42a being electrically connected to the independent electrode 22a via the wiring hole 31a on the first overlapping electrode 21a and the second conducting wire 42b being electrically connected to the serially-connected electrode 22b via the wiring hole 31b on the second overlapping electrode 21b. The insulation bridge 32 can generate insulation effect between the connection line 22c and the bridge wire 41. In an embodiment, quantity of bridge wires 41 formed can be equal to that of the insulation bridges 32 so that the bridge wires 41 can be electrically connected to the independent electrodes 22a at both sides of the connection lines 22c along the second polar axis direction 20b. Quantity of main conducting wires 42 can be equal to the total quantity of the first overlapping electrodes 21a and the second overlapping electrodes 21b so that one end of each first conducting wire 42a and second conducting wire 42b can be electrically connected to the independent electrode 22a and the serially-connected electrode 22b respectively, and the other end of the first conducting wire 42a and the second conducting wire 42b respectively forms a conductive terminal 43 to externally connect a flexible circuit so that touch potential signals are output to a control circuit for detection of the touch instruction.

In another embodiment, the circuit layer can be made of silver paste, which has a property of opaqueness, and therefore when compared with the previous step S20, the insulation layer 30 must also be made of an insulating plastic material which is opaque and enough to cover the main conducting wires 42 in the periphery area 12 and the bridge wires 41 in the touch area 11. In another embodiment, width of the connection line 22c can be made small so as to make the unit area that the insulation bridge 32 covers the connection line 22c and the unit area of the bridge wire 41 exposed comparatively small, so that it is not easy for naked eyes to perceive the opaque insulation bridges 32 and bridge wires 41 within the region scope of the touch area 11.

Besides, the circuit layer 40 in step S30 can also adopt ITO, which is used for high-temperature sputtering, as a conductive material. The step can then include disposing and forming transparent bridge wires 41 and main conducting wires 42 by disposition means of sputtering in the temperature of 300~400° C., and then through solvent etching or laser etching without baking. In this embodiment, compared with the previous step S20, transparent insulating plastic material can be adopted to make the transparent shielding layer 31 in the periphery area 12 and the transparent insulation bridges 32 in the touch area 11; the shielding layer 31 has a good insulating performance and therefore it can effectively avoid mutual conduction of the main conducting wires 42 arising from the outside interferences.

Moreover, for transparent or opaque main conducting wires 42 in the periphery area 12, shell of the device can also be utilized to cover the periphery area 12 to avoid exposure of the main conducting wires 42, which helps to achieve a better visual effect. After the circuit layer 40 is disposed, a layer of protection film which has insulation effect is usually disposed on the circuit layer 40.

In the steps from S10 to S30, heat resistance degree of the material of the substrate 10 in the present disclosure, such as general glass or passivation material, can reach 450° C., and therefore it is enough to directly bear the sputtering temperature (30~40° C.) and the baking temperature (240° C.) without being damaged easily. The insulation layer 30 and the shielding layer 31 will not be damaged because they are not sputtered or baked. The above factors contribute to maintaining insulating performance of the insulation layer 30 (comprising the shielding layer 31 and the insulation bridges 32), thereby avoiding mutual conduction of the circuits in the circuit layer 40.

According to the above manufacturing method of the present disclosure, a touch panel comprises of a multi-layer structure (referring to FIG. 4c, FIG. 5 and FIG. 6) formed by disposing the electrode layer 20 and the insulation layer 30, particularly comprising the multi-layer structure on the substrate 10 consisting of the overlapping electrodes 21 and the shielding layer 31.

The overlapping electrodes 21 are formed by disposing the electrode layer 20, namely formed by extending the electrode layer 20 from the touch area 11 of the substrate 10 to the periphery area 12 of the substrate 10. Electrical signals of the touch area 11 are transmitted to the external control circuit through the overlapping electrodes 21, wherein the periphery area 12 surrounds the periphery of the touch area 11.

The shielding layer 31 is formed by disposing the insulation layer 30. More particularly, the shielding layer 31 is disposed in the periphery area 12 of the substrate 10 and covers the overlapping electrodes 21 in the periphery area 12.

More specifically, disposition of the electrode layer 20 further comprises forming sensing electrodes 22 in the touch area 11. The sensing electrodes 22 comprise a plurality of independent electrodes 22a, serially-connected electrodes 22b and connection lines 22c. The serially-connected electrodes 22b are disposed along a first polar axis direction 20a; the connection lines 22c are set between the serially-connected electrodes 22b and electrically connected to the serially-connected electrodes 22b; the independent electrodes 22a are mutually insulated and disposed at both sides of the connection lines 22c with intervals along a second polar axis direction 20b.

Substantially, the overlapping electrodes 21 formed by disposing the electrode layer 20 comprise first overlapping electrodes 21a and second overlapping electrodes 21b. The first overlapping electrodes 21a are formed by extending the independent electrodes 22a to the periphery area 12 while the second overlapping electrodes 21b are formed by extending the serially-connected electrodes 22b to the periphery area 12, wherein extension directions of the independent electrodes 22a and the serially-connected electrodes 22b can be different based on the above disclosed manufacturing method. More specifically, the first overlapping electrodes 21a and the second overlapping electrodes 21b are covered by the shielding layer 31 substantially, and wiring holes 31a through the shielding layer 31 are formed on the first overlapping electrodes 21a while wiring holes 31b through the shielding layer 31 are formed on the second overlapping electrodes 21b.

Disposition of the shielding layer 31 further comprises forming several insulation bridges 32 in the touch area 11. The insulation bridges 32 are set correspondingly on the connection lines 22c of the sensing electrodes 22.

Substantially, touch panel of the present disclosure further comprises a multi-layer structure formed by adding a circuit layer 40 on the shielding layer 31 and the insulation bridges 32 (referring to FIG. 4c and FIG. 7). The circuit layer 40 forms several main conducting wires 42 which are electrically connected to the overlapping electrodes 21 and set on the shielding layer 31 of the periphery area 12. More specifically, the circuit layer 40 also comprises several bridge wires 41, wherein the bridge wires 41 are set on the insulation bridges 32 of the touch area 11 by the method of bridging. The bridge wires 41 are electrically connected to the independent electrodes 22a at both sides of the connection lines 22c while the main conducting wires 42 are electrically connected to the overlapping electrodes 21 through the wiring holes on the overlapping electrodes 21. More specifically, the main conducting wires 42 comprise first conducting wires 42a and second conducting wires 42b, the first conducting wires 42a being electrically connected to the independent electrodes 22a via the wiring holes 31a on the first overlapping electrodes 21a and the second conducting wires 42b being electrically connected to the serially-connected electrodes 22b via the wiring holes 31b on the second overlapping electrodes 21b.

The Second Embodiment

Figure 8:
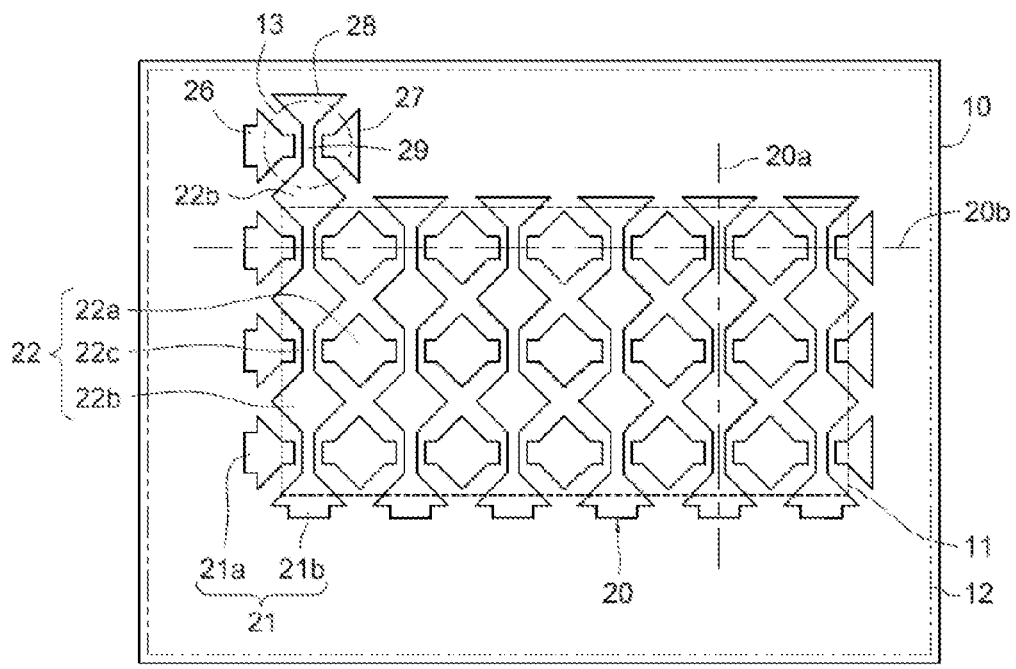
FIG. 8 to FIG. 10 are plan bottom views of the touch panel with icon area in the present invention disclosed one by one according to the method of FIG. 3.
Figure 9:
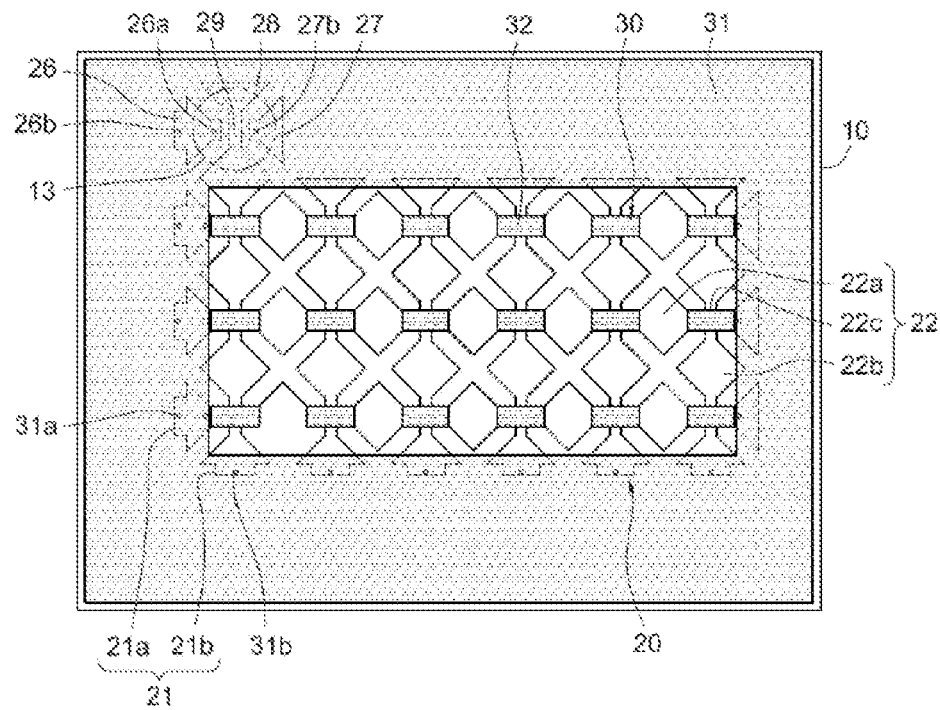
Figure 10:
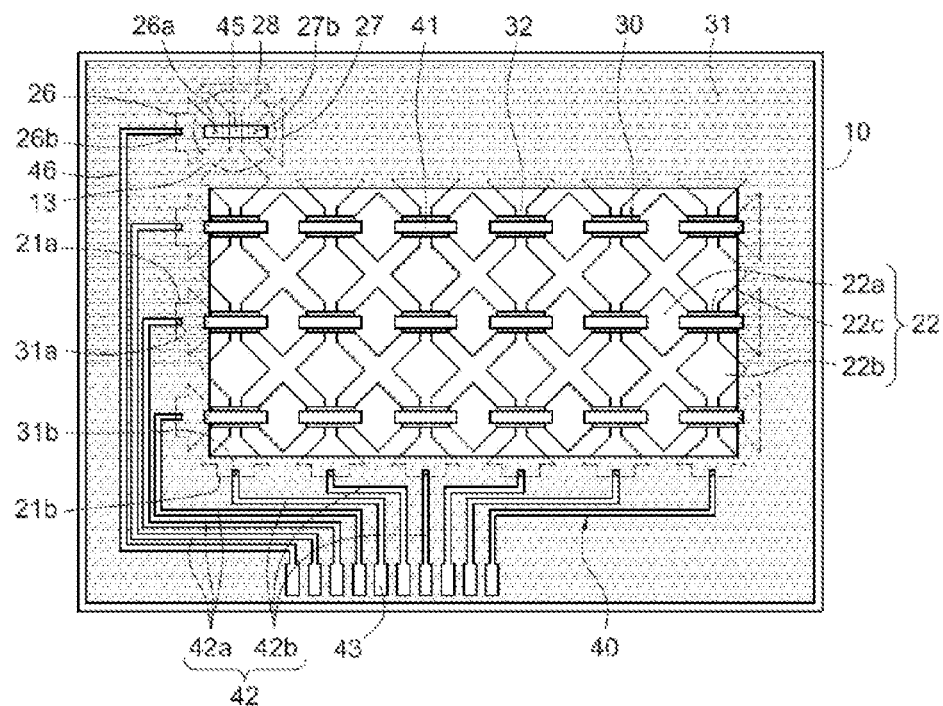

FIG. 8 to FIG. 10 disclose plan bottom views of the touch structure formed in an icon area 13 of the present disclosure in the process of disposing the electrode layer 20, the insulation layer 30 and the circuit layer 40, illustrating that in a specific embodiment of the manufacturing method, the substrate 10 further comprises an icon area 13 preset within the region scope of the periphery area 12.

In step S10, especially in the step of forming the overlapping electrodes 21 and the sensing electrodes 22, the electrode layer 20 can simultaneously be disposed to form an independent end electrode 26, an independent sub-electrode 27, a serially-connected sub-electrode 28, and a sub connection line 29 extending from the serially-connected electrode 22b to the icon area 13, wherein the serially-connected sub-electrode 28 and the serially-connected electrode 22b are serially and electrically connected by the sub connection line 29. Mutually insulated independent end electrode 26 and independent sub-electrode 27 are formed at both sides of the sub connection line 29 with intervals.

In step S20, the shielding layer 31 also covers the icon area 13 including the independent end electrode 26, independent sub-electrode 27, serially-connected sub-electrode 28, and sub connection line 29, wherein the independent end electrode 26 and the independent sub-electrode 27 respectively expose a sub wiring hole 26a and a sub wiring hole 27b through the shielding layer 31 at the place close to the sub connection line 29 and the independent end electrode 26 also exposes an end wiring hole 26b through the shielding layer 31.

It step S30, the circuit layer 40 is simultaneously disposed in the icon area 13 to contact the shielding layer 31 so that a bridge sub-wire 45 and an overlapping sub-wire 46 can be formed simultaneously, wherein the bridge sub-wire 45 in the icon area 13 is electrically connected to the independent end electrode 26 and the independent sub-electrode 27 via the sub wiring holes 26a and 27b while the overlapping sub-wire 46 is electrically connected to the independent end electrode 26 and the conductive terminal 43 via the end wiring hole 26b.

According to the above manufacturing steps, in the disposition step, disposition of the icon area 13, the touch area 11, and the periphery area 12 can be conducted simultaneously.

Besides, the independent end electrode 26 and the independent sub-electrode 27 are disposed along the second polar axis direction 20b and the serially-connected sub-electrode 28 is disposed along the first polar axis direction 20a. In addition, the independent end electrode 26, independent sub-electrode 27, and serially-connected sub-electrode 28 can be disposed along other extension directions between the first polar axis direction 20a and the second polar axis direction 20b according to various designs of the icon area 13 by the designer.

According to the above-mentioned method, it is possible to manufacture a touch panel with the icon area 13 on the substrate 10 in accordance with the present invention.

Icon area 13 comprises the independent end electrode 26 and the independent sub-electrode 27 formed by the electrode layer 20 and the serially-connected sub-electrode 28 and the sub connection line 29 (as shown in FIG. 8) formed by extending from the serially-connected electrode 22b to the icon area 13, wherein the serially-connected sub-electrode 28 and the serially-connected electrode 22b are serially and electrically connected by the sub connection line 29, and mutually insulated independent end electrode 26 and independent sub-electrode 27 are formed at both sides of the sub connection line 29 with intervals.

The shielding layer 31 also covers the icon area 13 (as shown in FIG. 9) including covering the independent end electrode 26, independent sub-electrode 27, serially-connected sub-electrode 28, and sub connection line 29, wherein the independent end electrode 26 and the independent sub-electrode 27 expose a sub wiring hole 26a and a sub wiring hole 27b through the shielding layer 31 respectively. The independent end electrode 26 also expose an end wiring hole 26b through the shielding layer 31.

The circuit layer 40 also forms a bridge sub-wire 45 and an overlapping sub-wire 46 (as shown in FIG. 10), making the bridge sub-wire 45 set on the shielding layer 31 of the icon area 13 and electrically bridged to the independent end electrode 26 and the independent sub-electrode 27 via the sub wiring holes 26a and 27b and making the overlapping sub-wire 46 set on the shielding layer 31 of the periphery area 12 and electrically connected to the independent end electrode 26 and the conductive terminal 43 via the end wiring hole 26b so that touch potential signals are output to a control circuit for detection of the touch instruction. The touch potential signals detected by the serially-connected sub-electrode 28 are transmitted to the control circuit through the serially-connected electrode 22b to which the serially-connected sub-electrode 28 is electrically connected.

Based on the above-mentioned method for the touch panels, touch structures in the touch area 11, periphery area 12, and icon area 13 all have the effects of maintaining insulating property of the shielding layer 31 and insulation bridges 32 in the insulation layer 30, avoiding fluctuation of resistance value in the electrode layer 20, and avoiding mutual conduction of the circuits in the circuit layer 40.

Although the present invention has been described with reference to the embodiments thereof and best modes for carrying out the present invention, it is apparent to those skilled in the art that a variety of modifications and changes may be made without departing from the scope of the present invention, which is intended to be defined by the appended claims.

What is claimed is:

1. A manufacturing method for a touch panel, comprising:
   disposing an electrode layer extending from a touch area of a substrate to form an overlapping electrode in a periphery area of the substrate such that electrical signals of the touch area are transmitted to an external control circuit through the overlapping electrode, wherein the periphery area surrounds periphery of the touch area;
   disposing an insulation layer in the periphery area of the substrate to form a shielding layer, wherein the shielding layer covers the overlapping electrode;
   forming a wiring hole through the shielding layer on the overlapping electrode; and
   disposing a circuit layer in the wiring hole and on the shielding layer to form a main conducting wire, wherein the overlapping electrode is electrically connected to the main conducting wire via the wiring hole.

2. The manufacturing method for a touch panel as claimed in claim 1, further comprising disposing the electrode layer in the touch area to form a sensing electrode while forming the overlapping electrode in the periphery area, wherein the sensing electrode comprises:
   a plurality of serially-connected electrodes disposed along a first polar axis direction;
   a connection line formed between the serially-connected electrodes and electrically connected to the serially-connected electrodes; and
   a plurality of independent electrodes, mutually insulated and disposed at both sides of the connection line with intervals along a second polar axis direction.

3. The manufacturing method for a touch panel as claimed in claim 2, wherein the step of forming the overlapping electrode in the periphery area comprises extending the independent electrodes and the serially-connected electrodes to the periphery area to form a first overlapping electrode and a second overlapping electrode respectively.

4. The manufacturing method for a touch panel as claimed in claim 3, further comprising:
   making the shielding layer cover the first overlapping electrode and the second overlapping electrode; and
   forming a wiring hole through the shielding layer respectively on the first overlapping electrode and the second overlapping electrode.

5. The manufacturing method for a touch panel as claimed in claim 4, wherein the step of forming the shielding layer in the periphery area further comprises disposing the insulation layer in the touch area covering the connection line on the sensing electrode at the same time to form an insulation bridge.

6. The manufacturing method for a touch panel as claimed in claim 5, further comprising disposing a circuit layer on the shielding layer to form a main conducting wire and disposing the circuit layer on the insulation bridge to form a bridge wire.

7. The manufacturing method for a touch panel as claimed in claim 6, wherein the bridge wire is electrically connected to the independent electrodes at both sides of the connection line and the main conducting wire comprises a first conducting wire and a second conducting wire, wherein the first conducting wire is electrically connected to the independent electrodes via the wiring hole on the first overlapping electrode, further wherein the second conducting wire is electrically connected to the serially-connected electrodes via the wiring hole on the second overlapping electrode.

8. The manufacturing method for a touch panel as claimed in claim 2, wherein the substrate further comprises an icon area in the periphery area and the manufacturing method further comprises disposing the electrode layer simultaneously to form an independent end electrode, an independent sub-electrode, and a serially-connected sub-electrode, and a sub connection line extending from the serially-connected electrode to the icon area while forming the overlapping electrode and the sensing electrode, wherein the serially-connected sub-electrode and the serially-connected electrode are serially and electrically connected by the sub connection line, further wherein mutually insulated independent end electrode and independent sub-electrode are formed at both sides of the sub connection line with intervals.

9. The manufacturing method for a touch panel as claimed in claim 8, wherein the shielding layer covers the icon area comprising the independent end electrode, independent sub-electrode, serially-connected sub-electrode, and sub connection line, further wherein the independent end electrode and the independent sub-electrode expose a sub wiring hole through the shielding layer respectively, further wherein the independent end electrode exposes an end wiring hole through the shielding layer.

10. The manufacturing method for a touch panel as claimed in claim 9, further comprising disposing a circuit layer on the shielding layer simultaneously to form a bridge sub-wire and an overlapping sub-wire, wherein the bridge sub-wire is formed in the icon area and electrically connects the independent end electrode and the independent sub-electrode via sub wiring holes while the overlapping sub-wire is electrically connected to the independent end electrode via the end wiring hole.

11. The manufacturing method for a touch panel as claimed in claim 1, wherein the main conducting wire is overlapped with the overlapping electrode.

12. The manufacturing method for a touch panel as claimed in claim 1, wherein the wiring hole though the shielding layer is located in the periphery area and ad acent to the touch area.

13. The manufacturing method for a touch panel as claimed in claim 1 further comprising disposing the circuit layer on the shielding layer to form the main conducting wire and a conductive terminal.

* * * * *